(12) United States Patent
Bevelacqua et al.

(10) Patent No.: US 9,547,335 B1
(45) Date of Patent: Jan. 17, 2017

(54) TRANSPARENT MODULE ANTENNA FOR WEARABLE DEVICES

(71) Applicant: Google Inc., Mountain View, CA (US)

(72) Inventors: Peter Bevelacqua, Mountain View, CA (US); Joseph John Hebenstreit, San Francisco, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/230,422

(22) Filed: Mar. 31, 2014

(51) Int. Cl.
*H01Q 1/12* (2006.01)
*G06F 1/16* (2006.01)
*H01Q 1/27* (2006.01)

(52) U.S. Cl.
CPC ............ *G06F 1/1601* (2013.01); *H01Q 1/273* (2013.01)

(58) Field of Classification Search
CPC ...... H01Q 1/38; H01Q 1/2225; G02B 27/017; G06K 19/07749
USPC .................................. 343/700 MS, 718, 702
See application file for complete search history.

(56) References Cited

U.S. PATENT DOCUMENTS

| | | | |
|---|---|---|---|
| 7,847,753 B2 | 12/2010 | Ishibashi et al. | |
| 8,269,108 B2 | 9/2012 | Kunishi et al. | |
| 8,295,128 B2 | 10/2012 | Hasumi et al. | |
| 8,519,849 B2 | 8/2013 | Ross-Messemer | |
| 8,827,445 B1* | 9/2014 | Wiser | G02C 7/04 351/158 |
| 2010/0097273 A1 | 4/2010 | Biris et al. | |
| 2014/0333490 A1* | 11/2014 | Dabov | H01Q 1/243 343/702 |
| 2014/0371558 A1* | 12/2014 | Etzkorn | G01N 27/3271 600/345 |
| 2015/0061837 A1* | 3/2015 | Honore | A61B 5/14532 340/10.31 |

* cited by examiner

*Primary Examiner* — Hoanganh Le
(74) *Attorney, Agent, or Firm* — Blakely Sokoloff Taylor & Zafman LLP (57) ABSTRACT

Embodiments describe a semi-transparent or transparent module antenna assembly disposed on a transparent portion of a user wearable device (e.g., a head wearable display or a smartwatch). Embodiments describe semi-transparent or transparent antenna assemblies disposed on portions of a wearable computing device not in direct contact with the user when the device is worn to increase the antenna's efficiency for receiving radio signals and to decrease the radiation absorbed by the user's body. Furthermore, the antenna is disposed on a transparent or semi-transparent surface to further increase the antenna's efficiency. For some embodiments utilized by head wearable displays, the portion of the device including the semi-transparent or transparent antenna assembly may be the optical system, which includes a transparent portion (e.g., a prism) for displaying CGI to a user; in other embodiments, the head wearable display including the semi-transparent or transparent antenna assembly is the lens.

19 Claims, 6 Drawing Sheets

TRANSPARENT MODULE ANTENNA FOR WEARABLE DEVICES

TECHNICAL FIELD

Embodiments of the disclosure relate to the field of computing devices, and more particularly, to wearable computing devices.

BACKGROUND

A wearable computing device is a device including a housing worn by a user. For example, a head wearable display is a display device worn on or about the head of a user. The size and form factor of wearable computing devices is minimized for reasons including user comfort, aesthetics, and cost. Antenna assemblies may be used by wearable computing devices for cellular connectivity, WiFi connectivity, Global Positioning System (GPS) services, and other applications. A solution to add these assemblies while minimizing the increase to the size and form factor of wearable computing devices is desired.

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Embodiments of an apparatus, system and method for utilizing transparent module antennas for wearable devices are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
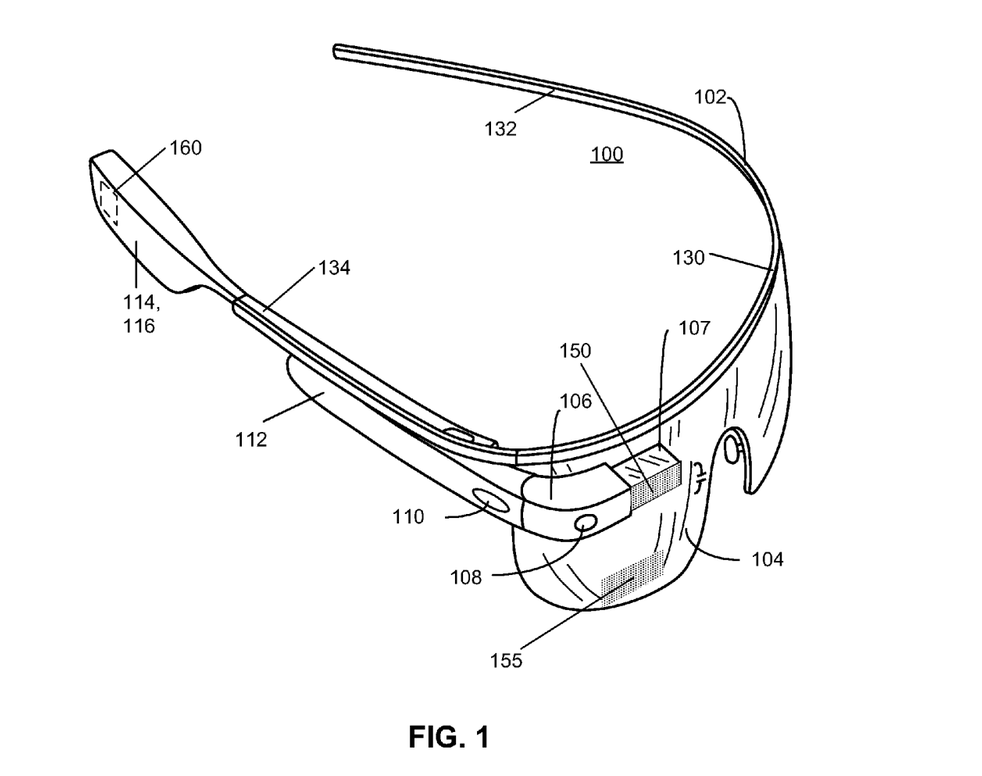
FIG. 1 is an illustration of a head wearable display including a multi-band antenna assembly according to an embodiment of the disclosure.

FIG. 1 is an illustration of a head wearable display including a multi-band antenna assembly according to an embodiment of the disclosure. Head wearable display 100 is illustrated as a wearable computing device in an eyeglasses frame form; in other embodiments, head wearable displays may comprise other form factors for providing a near-to-eye optical display for a user.

In this embodiment, frame 102 of head wearable display 100 includes center frame support 130 to support lens element 104, and extending side-arms 132 and 134. Center frame support 130 and side-arms 132 and 134 are configured to secure frame 102 to the head of a user via the user's nose and ears, respectively. Center frame support 130 and extending side-arms 132 and 134 may be formed of a solid structure of plastic or metal, or may be formed of a hollow structure of similar material so as to allow wiring and component interconnects to be internally routed through the frame. Alternatively or additionally, frame 102 may support external wiring.

In this embodiment, lens element 104 is at least partially transparent so as to allow the user to look through them so that head wearable display 100 may provide an augmented reality (AR) to the user (i.e., because the user's image of the world is augmented with an overlaying CGI, also referred to as a heads-up display (HUD)). Optical system 106 is illustrated as being positioned in front of lens 104, and thus head wearable display 100 comprises a single-eye display (i.e., a monocular head wearable display); other embodiments may comprise a dual-eye display (i.e., a binocular head wearable display).

Head wearable display 100 may include an internal processor to process data from, among other sources, various sensors including camera 108 when determining the virtual image that should be displayed to the user. Head wearable display 100 may include a touchpad used as a user input/output (I/O) interface (not shown) placed on either of side arms 132 and 134; in some embodiments, microphone 110 may also be used to capture voice input commands, and camera 108 may be used to capture user gesture based commands.

In this embodiment, camera 108 is shown to be located near optical system 106. Alternatively, camera 108 may be located elsewhere on frame 102, located separately from head wearable display 100, or be integrated into optical system 106. Camera 108 may image a field of view similar to what the user may see. Furthermore, camera 108 may allow for the processor of head wearable display 100 to interpret objects within the field of view and display context-sensitive virtual images. For example, if the camera 108 and the head wearable display processor capture image data and identify a target object, the system could alert the user by displaying an overlaid artificial image designed to draw the user's attention to the target object. These images could move depending upon the user's field of view or target object movement—i.e. user head or target object movements may result in the artificial images moving around the viewable area to sense the relative motion; furthermore, user eye movements, sensed via eye sensing modules, may also result in the artificial images moving around the viewable area to sense the relative motion.

Optical system 106 may further display instructions, location cues and other visual cues to enhance interaction with the target object. Camera 108 could be an autofocus camera that provides an autofocus signal. The head wearable display processor may adjust the length of the optical paths of optical system 106 based on the autofocus signal in order to present virtual images that correspond to the environment.

Head wearable display 100 may further include additional computing components and other I/O means (e.g., a motion sensor to detect head movement gestures as user input commands, audio speakers to output audio data to the user, etc.). Head wearable display 100 is shown to further include speaker 112, processor 114 and power supply 116 to supply power to the head wearable display and its components. Not all components of head wearable display 100 are illustrated; for example, some embodiments may include, for example, connectivity components and location sensors. Connectivity components may comprise components for either or both of cellular and wireless connectivity. As referred to herein, cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. As referred to herein, wireless connectivity refers to wireless connectivity that is not cellular, and can include personal area networks (such as Bluetooth), local area networks (such as Wi-Fi), and/or wide area networks (such as Wi-Max), or other wireless communication. Locations sensors may utilize the above described connectivity components (e.g., for Wi-Fi or cellular triangulation based processes) or may include other components such as a Global Positioning System (GPS) sensor.

The above described connectivity components may utilize a multi-band antenna for receiving signal data. A multi-band antenna is designed to operate in multiple frequency bands (e.g., any combination of cellular frequency bands, WiFi frequency bands, or GPS frequency bands). Embodiments describe a transparent or semi-transparent (i.e., imperfectly transparent) antenna disposed on a transparent portion of a user wearable device (such as head wearable display 100). Antennas perform better the further away they are from the user's body, as the user's body absorbs energy; as such, locating an antenna near the body greatly decreases the antenna's efficiency (and also increases the radiation absorbed by the user's body). For example, if an antenna is placed at location 160 (on side-arm 134), the efficiency of the antenna decreases as a result of the user's head (or anywhere else in contact with the user's body) potentially absorbing energy. Furthermore, the specific absorption rate (SAR) of radiation exposure can be greatly increased when the antenna is placed in contact with the user's head.

Embodiments describe transparent antennas disposed on portions of the device furthest from the user to increase antenna efficiency and decrease the SAR of radiation exposure of the user; furthermore these portions are comprised of semi-transparent or transparent material. Disposing the antenna on semi-transparent or transparent material further increases the efficiency of the antenna. In some embodiments for head wearable displays, the portion of the device including the semi-transparent or transparent antenna is the optical system, which includes a transparent portion for displaying CGI to a user. In other embodiments, the portion of the device including the semi-transparent or transparent antenna is the lens of the head wearable display. Locations 150 and 155 are shown as potential locations for an antenna assembly. Location 150 is shown to be on prism 107 of optical system 106, while location 155 is shown to be on lens element 104. In this embodiment, location 150 is shown to be in a position that is (when worn) further from the user compared to location 155; however, in some embodiments, other suitable regions be chosen for the location of the antenna assembly for any reason (e.g., regions comprising a greater surface area may be selected over smaller regions, for reasons discussed below).

Furthermore, given that head wearable display 100 is an on-face wearable product, antenna assemblies described herein may be designed to preserve the aesthetic features of the product. Thus, in some embodiments described below, antenna assemblies may be formed from transparent or semi-transparent materials such as transparent conductive films (e.g., metal oxide films) or thin conductive lines (e.g., copper lines, silver lines, nanowires, etc.).

In situations in which the systems discussed herein collect information specific to a user of a head wearable display, or may make use of personal information, the user may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, any collected or stored data related to the user may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
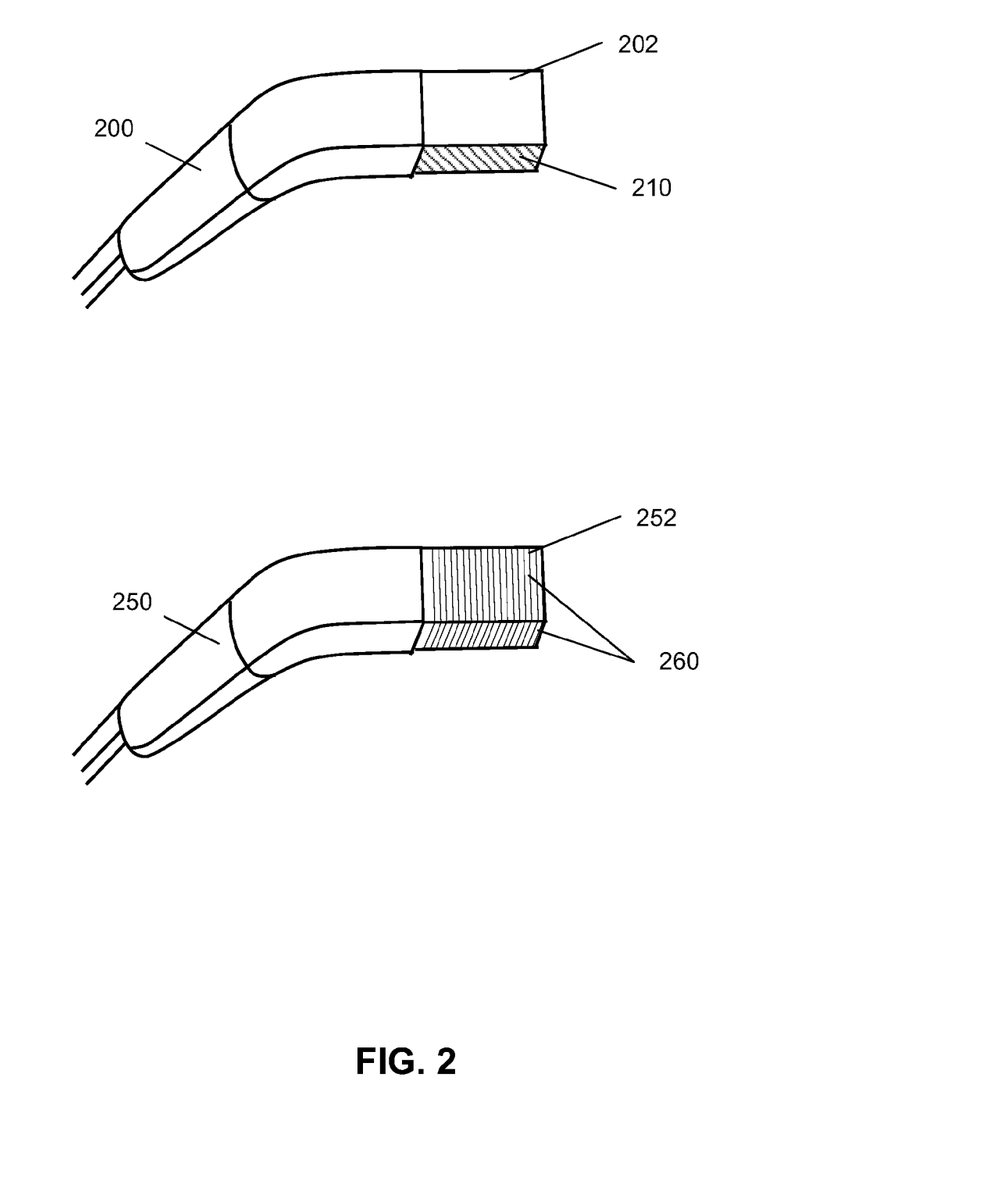
FIG. 2 is an illustration of a multi-band antenna assembly according to an embodiment of the disclosure.

FIG. 2 is an illustration of a multi-band antenna assembly according to an embodiment of the disclosure. The antenna assemblies illustrated utilize an optics module of a head wearable display as a radiating element, and thus "repurpose" the optics module to further function as a multi-band antenna. Antenna assembly 210 is shown to be disposed on prism 202 of optical system 200. In this embodiment, antenna assembly 210 is shown to be disposed on a single planar surface of prism 202. Antenna assembly 210 is semi-transparent and is disposed on a bottom side of prism 202 to limit its effect on the aesthetic appearance of optical system 200.

In some embodiments, antenna assemblies are utilized to receive radio signals on cellular frequency bands; because of the frequency of cellular radiation (i.e., lower frequencies compared to WiFi and GPS frequencies, which operate at bands higher than 1 GHz), said antenna assemblies utilize a larger space/area. Antenna assembly 260 is shown to be disposed on prism 252 of optical system 250. In this embodiment, antenna assembly 260 is shown to extend across a plurality of planar surfaces of prism 252. Increasing the volume of antenna assembly 260 increases the number of potential radio signal frequency bands that may be received by the antenna assembly.

Figure 3:
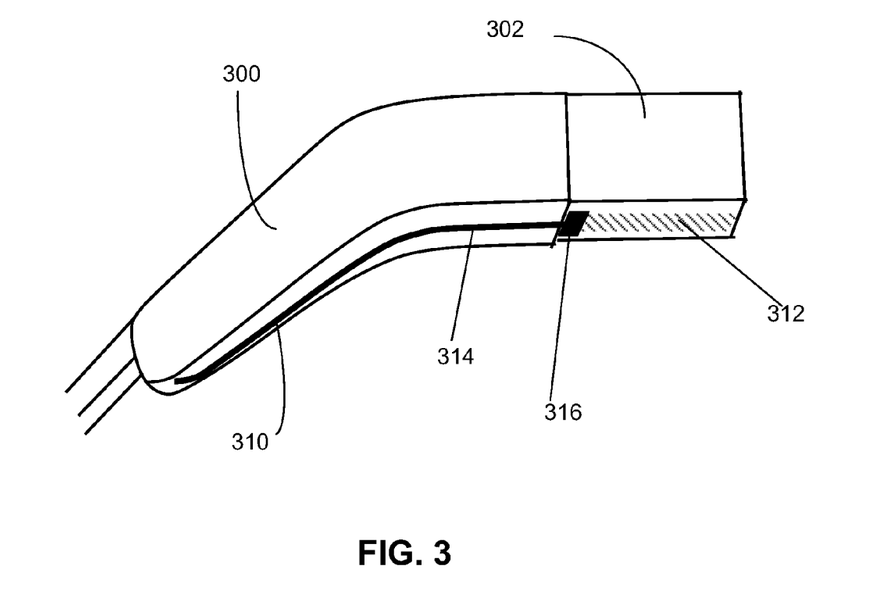
FIG. 3 is an illustration of a dipole antenna assembly according to an embodiment of the disclosure.

In the embodiments described above, a transparent conductive material forms a radiating element and is placed on an optics module as a substrate. Any type of antenna traces may be utilized by embodiments of the disclosure—e.g., monopole, dipole, slot, patch, loop inverted-F antenna (IFA), etc. FIG. 3 is an illustration of a dipole antenna assembly according to an embodiment of the disclosure. In this embodiment, antenna assembly 310 comprises a wide-band dipole antenna assembly disposed on the bottom side of optical system 300. As discussed above, for an antenna assembly to operate at low frequencies wherein electromagnetic wavelength increases, the antenna assembly is to increase in volume. In applications where the overall surface area of a transparent assembly is insufficient to include such an antenna assembly, embodiments may further utilize non-transparent surfaces of a mobile computing device.

In this embodiment, antenna assembly 310 comprises arms 312 and 314 coupled via pad 316; arm 312 comprises semi-transparent or transparent material disposed on prism 302, and arm 314 disposed a solid (i.e., non-transparent)

surface of optical system 300. As arm 314 is disposed on a non-transparent surface, said arm may comprise a non-transparent material (e.g., a solid metal antenna trace).

Figure 4:
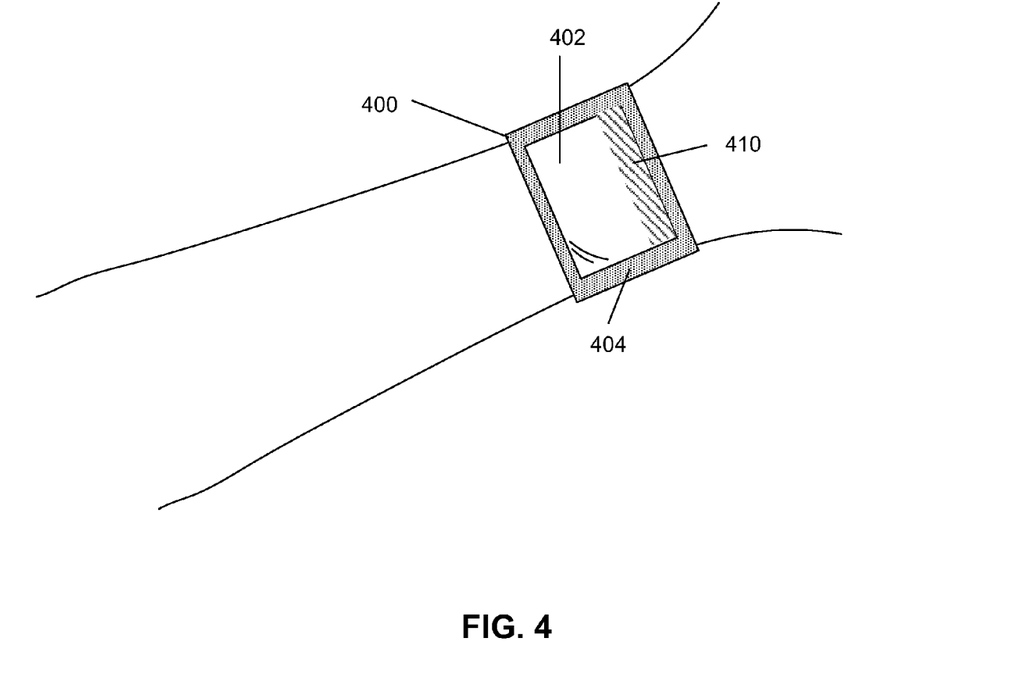
FIG. 4 is an illustration of a user wearable device including a multi-band antenna assembly according to an embodiment of the disclosure.

While the above embodiments describe antenna assemblies for head wearable displays, other embodiments may be utilized by other types of user wearable computing devices. FIG. 4 is an illustration of a user wearable device including a multi-band antenna assembly according to an embodiment of the disclosure. In this embodiment, wearable computing device 400 is illustrated as having a wristwatch form factor (and may be alternatively referred to as a "smartwatch"), and includes a display in place of a watch face, user input/output (I/O) components (or in some embodiments, the display may comprise a touchscreen I/O interface), image sensors, audio output components, computing components such as memory, processor cores, etc.

In this embodiment, the display of wearable computing device 400 includes transparent display surface 402 surrounded by non-transparent bezel 404. Antenna assembly 410 is shown to be disposed on a portion of display surface 402. As discussed above, placing antenna assembly 410 on a transparent surface that is not in contact with the user's body increases the efficiency of the antenna assembly and reduces the SAR radiation exposure of the user. Having antenna assembly 410 comprise transparent or semi-transparent material allows for the aesthetics of device 400 to be unaffected. Similar to the embodiment illustrated in FIG. 3 and discussed above, other embodiments may further utilize non-transparent portions of wearable computing device 400 (e.g., non-transparent bezel 404) to increase the volume of the antenna assembly.

Figure 5:
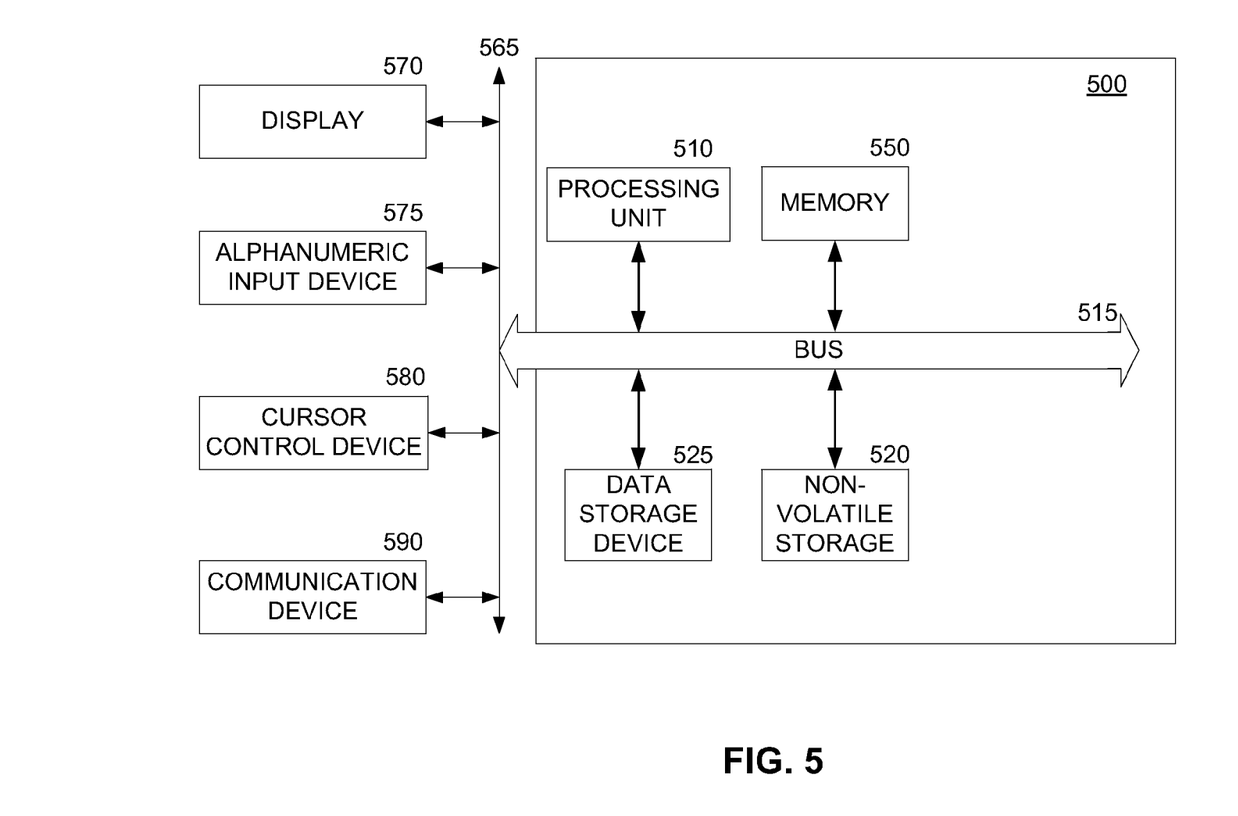
FIG. 5 is an illustration of components of a device to utilize an embodiment of the disclosure.

FIG. 5 is an illustration of components of a device to utilize an embodiment of the disclosure. Any combination of the components for platform 500 may be included in any of the wearable computing devices described above. For example, platform 500 may comprise display driver components communicatively coupled to a head wearable display or included in a smartwatch. Platform 500 may be used to decode/convert content into video signal formats such as high definition multimedia interface (HDMI), component, composite digital visual interface (DVI), video graphics adapter (VGA), Syndicat des Constructeurs d'Appareils Radiorecepteurs et Televiseursor (SCART), or other video signal formats.

Platform 500 as illustrated includes bus or other internal communication means 515 for communicating information, and processor 510 coupled to bus 515 for processing information. The platform further comprises random access memory (RAM) or other volatile storage device 550 (alternatively referred to herein as main memory), coupled to bus 515 for storing information and instructions to be executed by processor 510. Main memory 550 also may be used for storing temporary variables or other intermediate information during execution of instructions by processor 510. Platform 500 also comprises read only memory (ROM) and/or static storage device 520 coupled to bus 515 for storing static information and instructions for processor 510, and data storage device 525 such as a magnetic disk, optical disk and its corresponding disk drive, or a portable storage device (e.g., a universal serial bus (USB) flash drive, a Secure Digital (SD) card). Data storage device 525 is coupled to bus 515 for storing information and instructions.

Platform 500 may further be coupled to display device 570, such as a cathode ray tube (CRT) or an LCD coupled to bus 515 through bus 565 for displaying information to a computer user. Alphanumeric input device 575, including alphanumeric and other keys, may also be coupled to bus 515 through bus 565 (e.g., via infrared (IR) or radio frequency (RF) signals) for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570. In embodiments utilizing a touch-screen interface, it is understood that display 570, input device 575 and cursor control device 580 may all be integrated into a touch-screen unit.

Another device, which may optionally be coupled to platform 500, is a communication device 590 for accessing other nodes of a distributed system via a network. Communications device 590 may comprise any of the antenna assemblies described above. Communication device 590 may include any of a number of commercially available networking peripheral devices such as those used for coupling to an Ethernet, token ring, Internet, or wide area network. Communication device 590 may further be a null-modem connection, or any other mechanism that provides connectivity between computer system 500 and the outside world. Note that any or all of the components of this system illustrated in FIG. 5 and associated hardware may be used in various embodiments of the disclosure.

It will be appreciated by those of ordinary skill in the art that any configuration of the system illustrated in FIG. 5 may be used for various purposes according to the particular implementation. The control logic or software implementing embodiments of the disclosure can be stored in main memory 550, mass storage device 525, or other storage medium locally or remotely accessible to processor 510.

It will be apparent to those of ordinary skill in the art that any system, method, and process to capture media data as described herein can be implemented as software stored in main memory 550 or read only memory 520 and executed by processor 510. This control logic or software may also be resident on an article of manufacture comprising a computer readable medium having computer readable program code embodied therein and being readable the mass storage device 525 and for causing processor 510 to operate in accordance with the methods and teachings herein.

Embodiments of the disclosure may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 510, data storage device 525, bus 515, and memory 550, and only rudimentary communications mechanisms, such as a small touch-screen that permits the user to communicate in a basic manner with the device. In general, the more special-purpose the device is, the fewer of the elements need be present for the device to function.

Figure 6:
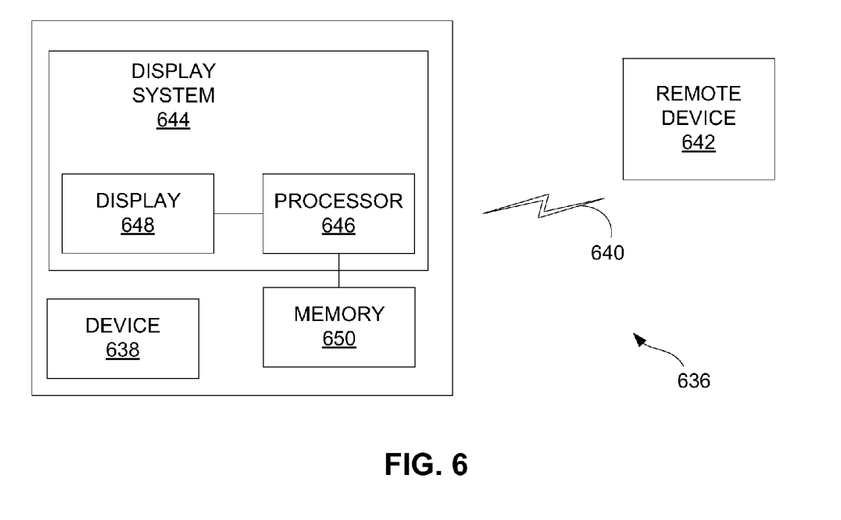
FIG. 6 is an illustration of an example computer network infrastructure for network accessible head wearable displays according to an embodiment of the disclosure.

FIG. 6 is an illustration of an example computer network infrastructure for network accessible head wearable displays according to an embodiment of the disclosure. In system 636, device 638 communicates using communication link 640 (e.g., a wired or wireless connection) to remote device 642. Device 638 may be any type of device that can receive data and display information corresponding to or associated with the data. For example, device 638 may be any of the wearable computing devices described above.

Device 638 includes display system 644 comprising processor 646 and display 648. Display 648 may be, for example, an optical see-through display, an optical see-around display, or a video see-through display. Processor 646 may receive data from remote device 642, and configure the data for display. Processor 646 may be any type of processor, such as a micro-processor or a digital signal processor, for example.

Device 638 may further include on-board data storage, such as memory 650 coupled to processor 646. Memory 650 may store software that can be accessed and executed by processor 646, for example.

Remote device 642 may be any type of computing device or transmitter including a laptop computer, a mobile telephone, etc., that is configured to transmit data to device 638. Remote device 642 and device 638 may contain hardware to enable communication link 640, such as processors, transmitters, receivers, any of the antenna assemblies described above, etc.

Communication link 640 is illustrated as a wireless connection; however, wired connections may also be used. For example, communication link 640 may be a wired link via a serial bus such as a universal serial bus or a parallel bus. A wired connection may be a proprietary connection as well. Communication link 640 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), among other possibilities, and utilizing a corresponding antenna assembly as described above. Remote device 642 may be accessible via the Internet and may comprise a computing cluster associated with a particular web service (e.g., social-networking, photo sharing, address book, etc.) to receive captured media data as described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

The invention claimed is:

1. A wearable computing device comprising:
 a transparent member including a prism;
 an antenna disposed on a surface of the prism and comprising transparent or semi-transparent material;
 radio frequency circuitry coupled to the antenna to receive signal data; and
 a wearable housing including the transparent member, the antenna, and the radio frequency circuitry, wherein the antenna does not contact a user when the wearable housing is worn by the user.

2. The wearable computing device of claim 1, wherein the wearable computing device comprises a head wearable display and further includes:
 at least one lens; and
 at least one image source positioned in front of the at least one lens to generate a light for the head wearable display and to include the prism to output the light;
 wherein the wearable housing comprises a frame assembly to support the at least one lens and the at least one image source for wearing on a head of the user.

3. The wearable computing device of claim 2, wherein the antenna is disposed on a bottom side of the prism.

4. The wearable computing device of claim 2, wherein the antenna is one of a monopole, dipole, slot, patch, loop, or inverted-F type antenna.

5. The wearable computing device of claim 1, wherein the antenna is included within a single planar surface of the prism.

6. The wearable computing device of claim 1, wherein the antenna extends across a plurality of planar surfaces of the prism.

7. The wearable computing device of claim 1, wherein the wearable computing device comprises a wristwatch, the wearable housing comprises a wearable band for wearing on a wrist of the user, and the device further comprises:
 an electronic display coupled to the wearable band, wherein the transparent member comprises a display surface of the electronic display.

8. The wearable computing device of claim 1, wherein the antenna is to receive radio signals from at least one of a cellular frequency band, a WiFi frequency band, or a Global Positioning System (GPS) frequency band.

9. The wearable computing device of claim 1, wherein the antenna comprises a plurality of conductive lines.

10. The wearable computing device of claim 9, wherein the plurality of conductive lines comprises nanowires.

11. The wearable computing device of claim 1, wherein the antenna comprises a metal oxide film.

12. The wearable computing device of claim 1, wherein the antenna further comprises a non-transparent portion disposed on a non-transparent surface of the wearable computing device.

13. A head wearable display comprising:
 at least one lens;
 at least one image source positioned in front of the at least one lens to generate light for the head wearable display and to include a prism to output the light;
 an antenna disposed on a plurality of planar surfaces of the prism of the at least one image source;
 radio frequency circuitry coupled to the antenna to receive signal data; and
 a frame assembly to support the at least one lens and the at least one image source for wearing on a head of a user.

14. The head wearable display of claim 13, wherein the antenna is one of a monopole, dipole, slot, patch, loop, or inverted-F type.

15. The head wearable display of claim 13, wherein the antenna further comprises a non-transparent portion disposed on a non-transparent member of the at least one image source.

16. The head wearable display of claim 13, wherein the antenna comprises a plurality of conductive lines.

17. The head wearable display of claim 13, wherein the plurality of conductive lines comprises nanowires.

18. The head wearable display of claim 13, wherein the antenna comprises a metal oxide film.

19. The head wearable display of claim 13, wherein the head wearable display comprises a monocular augmented reality (AR) display device having a single image source.

* * * * *